(12) United States Patent
Schmitt et al.

(10) Patent No.: US 11,704,278 B2
(45) Date of Patent: Jul. 18, 2023

(54) INTELLIGENT MANAGEMENT OF STUB FILES IN HIERARCHICAL STORAGE

(71) Applicant: International Business Machines Corporation, Armonk, NY (US)

(72) Inventors: Christof Schmitt, Tucson, AZ (US); Jeffrey Michale Ceason, Holmen, WI (US); Erik Rueger, Ockenheim (DE); Nicolo Sgobba, Fasano (IT)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 17/111,808

(22) Filed: Dec. 4, 2020

(65) Prior Publication Data

US 2022/0179824 A1    Jun. 9, 2022

(51) Int. Cl.
| | |
|---|---|
| *G06F 16/00* | (2019.01) |
| *G06F 16/11* | (2019.01) |
| *G06N 20/00* | (2019.01) |
| *G06F 11/34* | (2006.01) |
| *G06F 11/30* | (2006.01) |
| *G06F 16/16* | (2019.01) |

(52) U.S. Cl.
CPC ......... *G06F 16/113* (2019.01); *G06F 11/302* (2013.01); *G06F 11/3495* (2013.01); *G06F 16/162* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 7,010,553 B2* | 3/2006 | Chen | G06F 11/1435 707/999.203 |
| 7,197,570 B2* | 3/2007 | Eylon | G06F 16/10 709/231 |
| 7,546,324 B2* | 6/2009 | Prahlad | G06F 3/0607 |
| 7,617,217 B1* | 11/2009 | Chen | G06F 11/1435 |
| 8,170,985 B2 | 5/2012 | Zimran et al. | |
| 9,002,785 B2 | 4/2015 | Prahlad et al. | |

(Continued)

OTHER PUBLICATIONS

He et al.; "Coordinating Parallel Hierarchical Storage Management In Object-Base Cluster File Systems", University Of Minnesota, pp. 1-15, Jan. 1, 2006.

(Continued)

*Primary Examiner* — Jean M Corrielus
(74) *Attorney, Agent, or Firm* — Patterson + Sheridan, LLP

(57) ABSTRACT

Intelligent management of stub files in hierarchical storage is provided by: in response to identifying a file to migrate from a file system to offline storage, providing metadata for the file to a machine learning engine; receiving a stub profile for the file from the machine learning engine that indicates an offset from a beginning of the file and a length from the offset for previewing the file; and migrating the portion of the file from the file system to an offline storage based on the stub profile. In some embodiments this further comprises: monitoring file system operations; in response to detecting a read operation of the portion of the file: determining a file type; providing file data to the machine learning engine; and performing a supervised learning operation based on the file type and the file data to update the machine learning engine.

20 Claims, 8 Drawing Sheets

(56) References Cited

U.S. PATENT DOCUMENTS

| | | | |
|---|---|---|---|
| 9,213,721 B1 | 12/2015 | Faibish et al. | |
| 9,460,106 B2 | 10/2016 | Matsuzawa | |
| 9,804,930 B2* | 10/2017 | Vijayan | G06F 11/1451 |
| 9,811,423 B2* | 11/2017 | Vijayan | G06F 11/1469 |
| 10,222,994 B2 | 3/2019 | Araki et al. | |
| 10,430,723 B1* | 10/2019 | Tzur | G06F 3/0685 |
| 10,769,117 B2 | 9/2020 | Cruciani et al. | |
| 2001/0037399 A1* | 11/2001 | Eylon | H04L 65/612 |
| | | | 718/100 |
| 2003/0182312 A1* | 9/2003 | Chen | G06F 16/128 |
| 2012/0059797 A1* | 3/2012 | Prahlad | G11B 27/034 |
| | | | 707/652 |
| 2013/0006944 A1* | 1/2013 | Prahlad | G11B 27/034 |
| | | | 707/652 |
| 2014/0025914 A1* | 1/2014 | Prahlad | G06F 16/185 |
| | | | 711/162 |
| 2014/0188957 A1 | 7/2014 | Hosoi | |
| 2014/0201155 A1* | 7/2014 | Vijayan | G06F 11/1456 |
| | | | 707/647 |
| 2015/0378611 A1* | 12/2015 | Prahlad | G06F 16/1824 |
| | | | 707/626 |
| 2018/0018099 A1* | 1/2018 | Prahlad | G06F 3/0649 |
| 2019/0087596 A1 | 3/2019 | Lin | |
| 2019/0286613 A1 | 9/2019 | Bramante et al. | |
| 2020/0012619 A1 | 1/2020 | Gupta et al. | |
| 2020/0026784 A1 | 1/2020 | Miyoshi et al. | |
| 2020/0073574 A1 | 3/2020 | Pradhan | |
| 2021/0374021 A1* | 12/2021 | Santhakumar | G06F 11/3485 |

OTHER PUBLICATIONS

Matsuzawa et al.; "The Quick Migration Of File Servers", SYSTOR'18 11th ACM International Conference On, pp. 65-75, Jun. 4-7, 2018.

Zheng et al.; "T-Archive: A Novel HSM-Based Data Archive System", Data Science Journal, vol. 6, Suplement, pp. S441-S444, Aug. 4, 2007.

Cavalli et al.; "StoRM-GPFS-TSM: A New Approach To Hierarchical Storage Management For The LHC Experiments", Journal Of Physics: Conference Series 219, pp. 1-7, Jul. 1, 2010.

Seamans, Mark; "Tiered Data Management For Lustre", The Lustre Ecosystem, 3rd International Workshop On, pp. 1-40, Jul. 2017.

Wikipedia, "ID3," accessed online Oct. 20, 2020.

* cited by examiner

INTELLIGENT MANAGEMENT OF STUB FILES IN HIERARCHICAL STORAGE

BACKGROUND

The present invention relates to hierarchical storage, and more specifically, to the intelligent management of stub files therein. Hierarchical Storage Management (HSM) is a method that migrates the data of a file to long-term backup or archival storage (e.g., tape storage, cloud tiered storage); generally referred to herein as "offline storage". Various file systems, such as the General Parallel File System (GPFS), support this feature through the Data Management API (Application Program Interface) and stub files. In short, the data of a file is moved to offline storage from the original file system, and a stub file of defined size is left in the file system. Reading from the data that are contained in the stub file does not trigger a recall (movement of the data back from offline storage to the disk storage backing the file system), but reading parts that are not contained in the stub file does trigger a recall. Accordingly, users can browse the archival storage without triggering a time-consuming and resource-intensive recall action unless the full file is desired.

However, some applications access the files and read data from these files without considering whether the data has been migrated to offline storage. One example is the "Finder" application used in an operating system that reads from all files during a directory listing to generate preview images. Indiscriminate access and reading can cause what is called a "recall storm", in that each file is accessed outside of the stub file simply to generate a preview image, leading to a massive movement of data back to disk storage from offline storage, which can overload the system or use an excessive amount of disk space. Although providing a larger stub region (e.g., with sufficient data for the previews generated by the "Finder" application), can mitigate the issues of a recall storm, providing larger stub files reduces the effectiveness of migrating data to offline storage, and every file format stores data differently; potentially rendering the larger stub file both less effective at offloading storage from the file system and still vulnerable to recall storms. Other problems with recalls from cloud storage can be additional data transfer costs charged by the cloud provider, wear on tape drives with tape storage, and the latency required for the recall, which should be avoided in the simple query cases.

SUMMARY

According to one embodiment of the present disclosure, a method is provided that includes: in response to identifying a file to migrate from a file system to offline storage, providing metadata for the file to a machine learning engine; receiving a stub profile for the file from the machine learning engine that indicates an offset from a beginning of the file and a length from the offset for previewing the file; and migrating the portion of the file from the file system to an offline storage based on the stub profile.

According to one embodiment of the present disclosure, a system is provided that includes a processor; and a memory including instructions that when executed by the processor perform an operation that includes: in response to identifying a file to migrate from a file system to offline storage, providing metadata for the file to a machine learning engine; receiving a stub profile for the file from the machine learning engine that indicates an offset from a beginning of the file and a length from the offset for previewing the file; and migrating the portion of the file from the file system to an offline storage based on the stub profile.

According to one embodiment of the present disclosure, a computer-readable storage medium including instructions that when executed by a processor perform an operation that includes: in response to identifying a file to migrate from a file system to offline storage, providing metadata for the file to a machine learning engine; receiving a stub profile for the file from the machine learning engine that indicates an offset from a beginning of the file and a length from the offset for previewing the file; and migrating the portion of the file from the file system to an offline storage based on the stub profile.

DETAILED DESCRIPTION

The present disclosure addresses and mitigates the likelihood of recall storms when accessing stub files in a file system associated with archived versions of associated files stored in offline storage. By automatically recognizing data that should be contained in stub files, the present disclosure can customize the stub files, thereby allowing applications to generate preview and overview data without triggering recall storms. Because the Data Management API (DMAPI) that is used between Hardware Security Module (HSM) applications and the file system to trigger recalls does not require stub data blocks to start at the beginning of the file, the stub files can include various lengths of data offset from the beginning of the file. The DMAPI specification defines "managed regions" that can be set at arbitrary positions to form the stub files. However, as each file type stores data differently, setting an individual idealized position for every file type would require an unmanageably large and ever-growing database for offsets for different file types.

Instead, by handling file access in a stub data manager, the present disclosure allows for a machine learning engine (also referred to as a cognitive engine) to learn which regions of an original file to include in a stub file, and which regions should be moved to offline storage. The machine learning engine configures the HSM application according to the learned regions based on an initial learning stage for a neural network configured using the observed Input/Output (I/O) patterns from offline storage I/O. Later decisions on which data to move to offline storage are then identified by the machine learning engine. A feedback mechanism allows the administrator to provide input back to the machine learning engine to improve future configurations to further reduce recall storms as new file types are observed or better observations (or new use behaviors) are developed for existing file types. Accordingly, the present disclosure improves the operation of offline storage and the computing systems using offline storage by reducing the amount of data recalls required, thus saving time (e.g., recall latency), reducing bandwidth usage, and reducing wear on the storage media.

Figure 1:
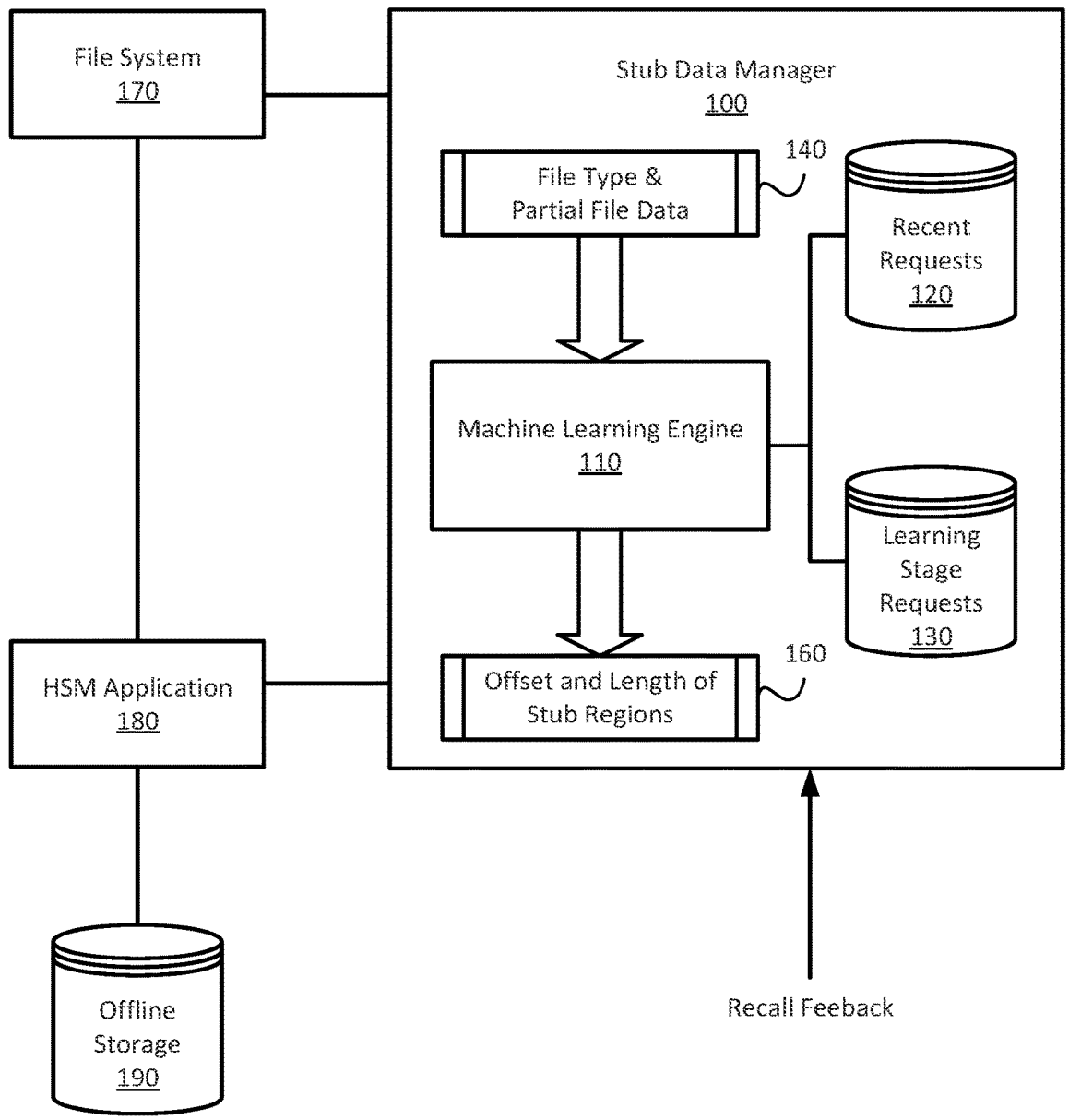
FIG. 1 illustrates a stub data manager, according to embodiments of the present disclosure.

FIG. 1 illustrates a stub data manager 100, according to embodiments of the present disclosure. The stub data manager 100 includes a machine learning engine 110 that learns the various regions to be included in the stub files by tracking recent requests 120 for stub files that triggered recalls from offline storage 190. The machine learning engine 110 also develops and uses a collection of learning stage requests 130 that are collected from a first learning stage (discussed in greater detail in regard to FIG. 2) for use in a second learning stage (discussed in greater detail in regard to FIG. 3) to improve the operation of the stub data manager 100.

The stub data manager 100 interacts with a file system 170 that holds online data and stub files associated with files held in offline storage 190. The file system 170 can be hosted by a single computing device, a locally-managed network of computing devices, a cloud-based network of computing devices (and virtual devices), and combinations of cloud and local networks. The file system 170 reports to the stub data manager 100 when files held in offline storage 190 are accessed (including the file type, offset, and length of stub file used to access the offline version of the file). In various embodiments, an administrative user reports which (if any) of the access events reported by the file system 170 resulted in an unwanted recall. These reports from the administrative user can be batched (i.e., collecting reports for access events observed over a given time period or number of undesired recalls) or sent in response to determining that an individual recall was undesired. An undesired recall is detected in response to the file system 170 requesting the offline data and not using, or minimally using, the recalled data. An administrative user can set various use threshold for recalled data (e.g., held in memory for at least n clock cycles, at least n % of the file data used in an output, whether a DMAPI managed region was accessed, an open call without a read call, etc.) to determine what recalls qualify as undesired or as desired, and various administrative users can set individualized use thresholds based on the usage needs of the file system 170, the offline storage 190, or both.

The HSM application 180 is operated on a device or network that provides the offline storage 190 to identify the data that should be contained in each stub file. A file held in online storage (e.g., the file system 170) includes metadata, content data, and preview data. Ideally, the HSM application 180 creates a stub file based on an original file that includes the metadata and preview data for that file, but excludes the content data. Examples of preview data can include thumbnail images or cropped images for image files, video clips or still images for video files, sound clips for sound files, images of a first or representative section of a word processing, presentation, or spreadsheet document, or the like that provide a lower resolution or reduced-size portion of the file. Accordingly, an ideal stub file contains a minimal amount of data that allows a user of the file system 170 to determine whether full access to the file's data is desired or not, without having to access the portion stored in offline storage 190. The stub data manager 100 learns which portions of a file to include in the stub file based on the feedback received from the administrative users, and the use patterns of the various users and applications accessing the stub files on the file system 170.

In various embodiments, the offline storage 190 is provided by one or more computing devices or computer storage devices, such as, for example, cloud networked storage or tape drives. In various embodiments, when a file is migrated to offline storage 190, the stub file links to the offline data, which can include just the content data or can be a full version of the original file (e.g., the metadata, content data, and preview data) available for recall to the file system 170.

When an I/O request triggers a file recall from the offline storage 190, the details (e.g., file name, offset, and length) of the recall are recorded in the stub data manager 100. These details are used in case an undesired recall was performed to allow an administrator to identify the undesired call to train the machine learning engine 110 to structure the stub files avoid such recalls in the future. When an administrator reports an undesired recall of a file to the stub data manager 100, the stub data manager 100 uses the provided file name to look up the request that caused the undesired recall. The stub data manager 100 then determines the file type, reads the file data and provides additional learning input to the machine learning engine 110 to improve or update how stub files are generated to thereby avoid a similar undesired recall in the future. Accordingly the machine learning engine 110 is trained using the file type and file data as learning input and the offset and length of the request causing the recall are used as the expected output in a supervised learning data set, so that a similar recall request would fall outside of a stub region in stub files created in the future.

The machine learning engine 110 includes one or more artificial neural networks that receive inputs 130 of file type (e.g., PDF, GIF, JPG) and at least partial file data from the associated file. These inputs are processed by the neural network(s) to identify regions of the files to keep in the stub file as the output, including at least one offset from a start of the file and the lengths of the stub regions to retain (e.g., the X bits beginning Y bits from the start of the original file). Because different users may run different applications with different access patterns for the various files, the machine learning engine 110 learns how the stub files should be created based on observed experiences unique to each file system 170. Accordingly, the machine learning engine 110 can learn that for a first file system 170 that the stub file characteristics should be different for a second file system 170, even when referring to the same type of original file.

Figure 2:
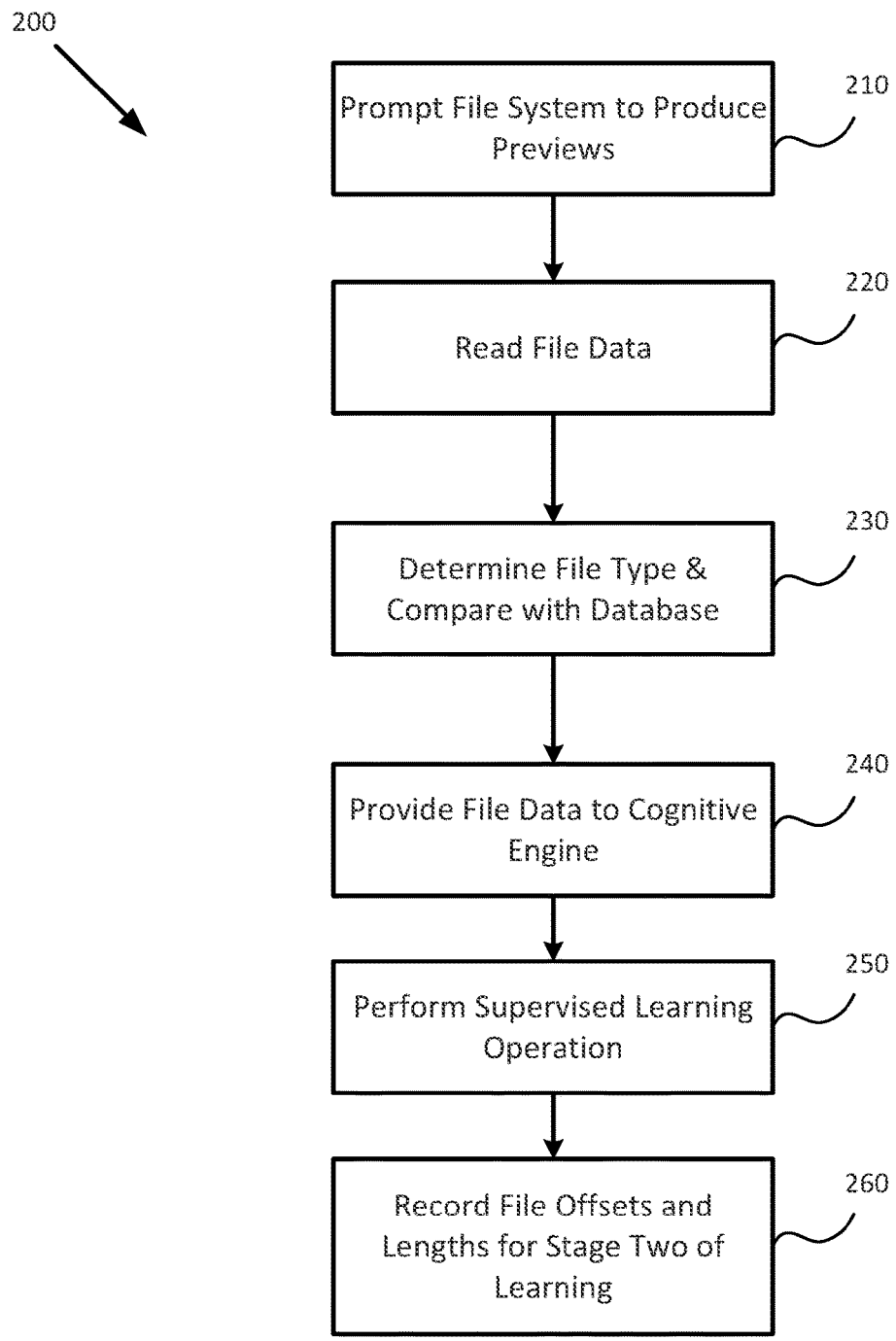
FIG. 2 is a flowchart of a method for a first learning stage for the machine learning engine, according to embodiments of the present disclosure.

FIG. 2 is a flowchart of a method 200 for a first learning stage for the machine learning engine 110, according to embodiments of the present disclosure. Method 200 describes a portion of an explicit learning process for the stub data manager 100 to learn the initial requirements for stub files for preview generation in the file system 170. Method 200 begins at block 210, where the stub data manager 100 prompts the file system 170 to run workloads that generate previews for various files stored online in the file system 170, such as, for example, viewing directory listings from a graphical interface for the file system 170. During the preview generation process, the stub data manager 100 receives read access requests with the file name for each file, the offset of each file, and the length of each file, and monitors how each individual file is handled. In various embodiments, the stub data manager 100 traces the open, read, write, and related I/O system calls. Depending on the operating system and file structure used by the file system 170, the stub data manager 100 can use various frameworks to trace the system calls to collect the file name (e.g., in the open call), the file descriptor and process identifier to identify which process opened the file and match subsequent read/write calls from that process to the file.

At block 220, the stub data manager 100 reads the data of the original file. In various embodiments, when a size threshold for the file is satisfied (e.g., for files of at least X bytes in size), the stub data manager 100 reads a subset of the file data that includes the first A bytes of the file and the last B bytes of the file. In embodiments when the size of the file is below a size threshold, the stub data manager 100 reads the entirety of the file.

At block 230, the stub data manager 100 determines the file type of the original file, and compares the determined file type against a database. In various embodiments, the file type is determined from a metadata field for the file, a file name (e.g., a file extension), or combinations thereof. Comparing the determined file type against a database identifies previously identified files of the same or similar type to aid the machine learning engine 110 in determining how stub files for that file type should be configured. For example, after identifying a file type of ".DOCX", other files of the ".DOCX" type can be retrieved to train the machine learning engine 110 on. Additionally or alternative, after identifying a file type of ".DOCX", the stub data manager 100 can identify similar file types such as files of an older type or version of the file type (e.g., ".DOC"), files opened or openable by a shared application (e.g., all file types associated by the file system 170 with a word processor application identified as opening the ".DOCX" file type), alternative designations for the file type (e.g., ".JPG" vs. "JPEG"), or the like.

At block 240, the stub data manager 100 provides the file data to the machine learning engine 110. In various embodiments, the file data includes the file type, the full data of the file (e.g., metadata, content data, and preview data), offset, and length of the read request. The file type and the full data are used as inputs for the neural network(s) of the machine learning engine 110, and the offsets and lengths are used as the expected outputs. Accordingly, the observed I/Os from preview generation provide a supervised learning set for the machine learning engine 110.

At block 250, the stub data manager 100 performs a supervised learning operation on one or more machine learning models used by the machine learning engine 110. In various embodiments, the various metadata collected by the stub data manager 100 in relation to the individual files provides an input vector to an artificial neural network (ANN, generally, neural network) included in the machine learning engine 110. In the neural network, various nodes are connected together in layers to process the incoming input vector to produce a stub profile that indicates what regions of the file should remain in the stub file in the file system 170, and which should be migrated to offline storage 190. The supervised learning operation sets the various weights of these nodes to (ideally) produce outputs matching the offsets and lengths selected by the preview generation process.

Figure 3:
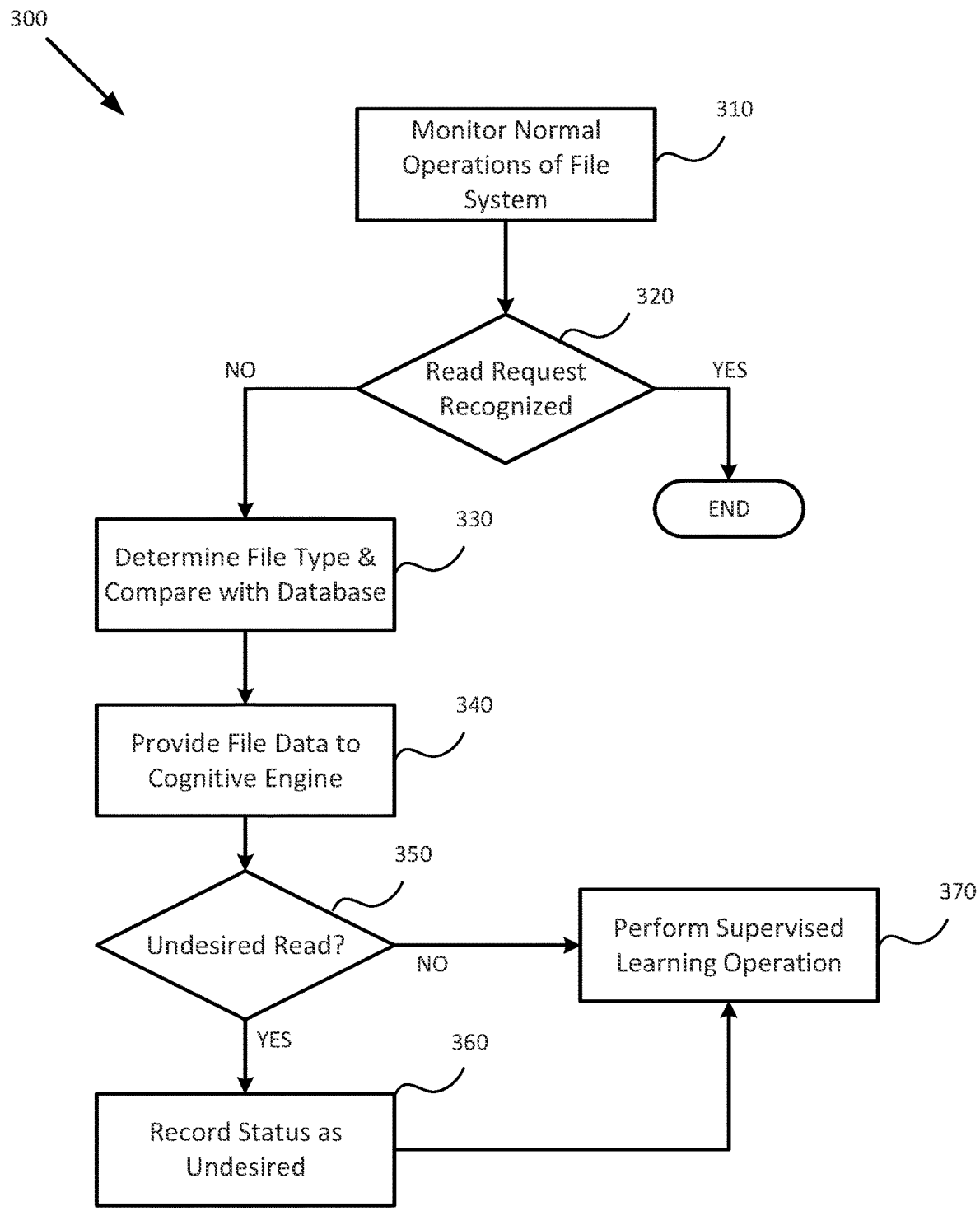
FIG. 3 is a flowchart of a method for a second learning stage for the machine learning engine, according to embodiments of the present disclosure.

At block 260, stub data manager 100 records the offsets and lengths output by the machine learning engine 110 for use in conjunction with the second stage of learning, described in greater detail in regard to FIG. 3.

FIG. 3 is a flowchart of a method 300 for a second learning stage for the machine learning engine 110, according to embodiments of the present disclosure. Method 300 describes a portion of an explicit learning process for the stub data manager 100 to learn the initial requirements for stub files during normal operations of the file system 170. The stub data manager 100 monitors the file system 170 as the file system 170 runs regular workloads. At block 310, as part of monitoring normal operations of the file system 170, the stub data manager 100 receives a read request for a file stored in the offline storage 190, which include the filename for the requested file, the offset form the start of the file to be read from, and the length in the file to read. For each read request, the stub data manager 100 performs method 300, which can update the various weights in the neural networks of the machine learning engine 110, thus allowing the stub data manager 100 to adapt how stub files are created to reflect current operating conditions.

At block 320, the stub data manager 100 determines whether the read request has been previously recognized from one of the files analyzed in the first learning stage (e.g., as part of method 200 discussed in relation to FIG. 2). When the read request is recognized as having been previously analyzed as part of the first learning stage, method 300 may conclude for the given read request. When the read request is not recognized as part of the first learning stage, method 300 proceeds to block 330.

At block 330, the stub data manager 100 determines the file type of the file being read and compares the determined file type against a database of identified file types. In various embodiments, the file type is determined from a metadata field for the file, a file name (e.g., a file extension), or combinations thereof. Comparing the determined file type against a database identifies previously identified files of the same or similar type to aid the machine learning engine 110 in determining how stub files for that file type should be configured. For example, after identifying a file type of ".DOCX", other files of the ".DOCX" type can be retrieved to train the machine learning engine 110 on. Additionally or alternative, after identifying a file type of ".DOCX", the stub data manager 100 can identify similar file types such as files of an older type or version of the file type (e.g., ".DOC"), files opened or openable by a shared application (e.g., all file types associated by the file system 170 with a word processor application identified as opening the ".DOCX" file type), alternative designations for the file type (e.g., ".JPG" vs. "JPEG"), or the like.

At block 340, the stub data manager 100 provides the file data to the machine learning engine 110. In various embodiments, the file data includes the file type, the full data of the file (e.g., metadata, content data, and preview data), offset, and length of the read request. The file type and the full data are used as inputs for the neural network(s) of the machine learning engine 110, and the offsets and lengths are used as the expected outputs. Accordingly, the observed I/Os from regular operation provide a supervised learning set for the machine learning engine 110 where the offset and length are expected to fall outside of a stub region (i.e., the region of the original file not removed to offline storage 190 and remaining in the stub file in the file system 170).

At block 350, the stub data manager 100 determines whether the read request was a desired read or an undesired read. In various embodiments, an administrative user may from time to time report one or more read operations as undesired (e.g., having accessed file data from offline storage 190 when not accessing the file data would have been preferable). Read requests are considered desired until the administrative user reports that the request was undesired, and the administrative user may report that a read request was undesired any time after the read request was submitted. In response to receiving feedback from the administrative user that the read request was undesired, method 300 proceeds to block 360, where the stub data manager 100 records the status of the read request as undesired.

Both the desired and undesired read requests, and the data associated with those read requests (e.g., offset and length of the read operation, desired/undesired status) are stored by the stub data manager 100 for updating the training of the neural networks included in the machine learning engine 110. At block 370, the stub data manager 100 performs a supervised learning operation to update the neural networks included in the machine learning engine 110. The stub data manager 100 uses the training data collected and analyzed during the first and second stages of learning to train a neural network in the machine learning engine 110 to identify offsets and lengths to set in the stub files to reduce read requests to the offline storage 190. In some embodiments, the stub data manager 100 may collect a threshold number of read requests before performing a learning operation to update the neural networks included in the machine learning engine 110 (e.g., method 300 of FIG. 3).

The training data collected and used during each of method 200 and method 300 can include various metadata including file type extensions, file attributes, files sizes, time of last access, time of last recall, file location, read data offset, read lengths, and the like. The stub data manager 100 can collect the training data from runtime tools and data probes (e.g., to identify and classify different types of storage to avoid unreliable, expensive, or slow storage devices when data are frequently accessed), configuration files, file or file system documentation or standards, and expert input or feedback.

As the training data discussed in relation to method 200 and method 300 relate to similar metadata collections, but different use cases, the stub data manager 100 separates the training data into different classes or groups. This separation is based on the metadata of the individual stub files and the metadata annotated from the training data, which is used to classify and manage the amount of data to be stored in the stub files. In various embodiments, as new use cases develop in the file system 170 (e.g., new programs are installed, new versions of file types are introduced, usage patterns change), the training data are annotated based on the time of collection so that older annotations or training data are removed or used less frequently than new annotations or training data. Accordingly, the stub data manager 100 can place greater emphasis on new data use patterns when training (or re-training) the neural networks in the machine learning engine 110.

Figure 4:
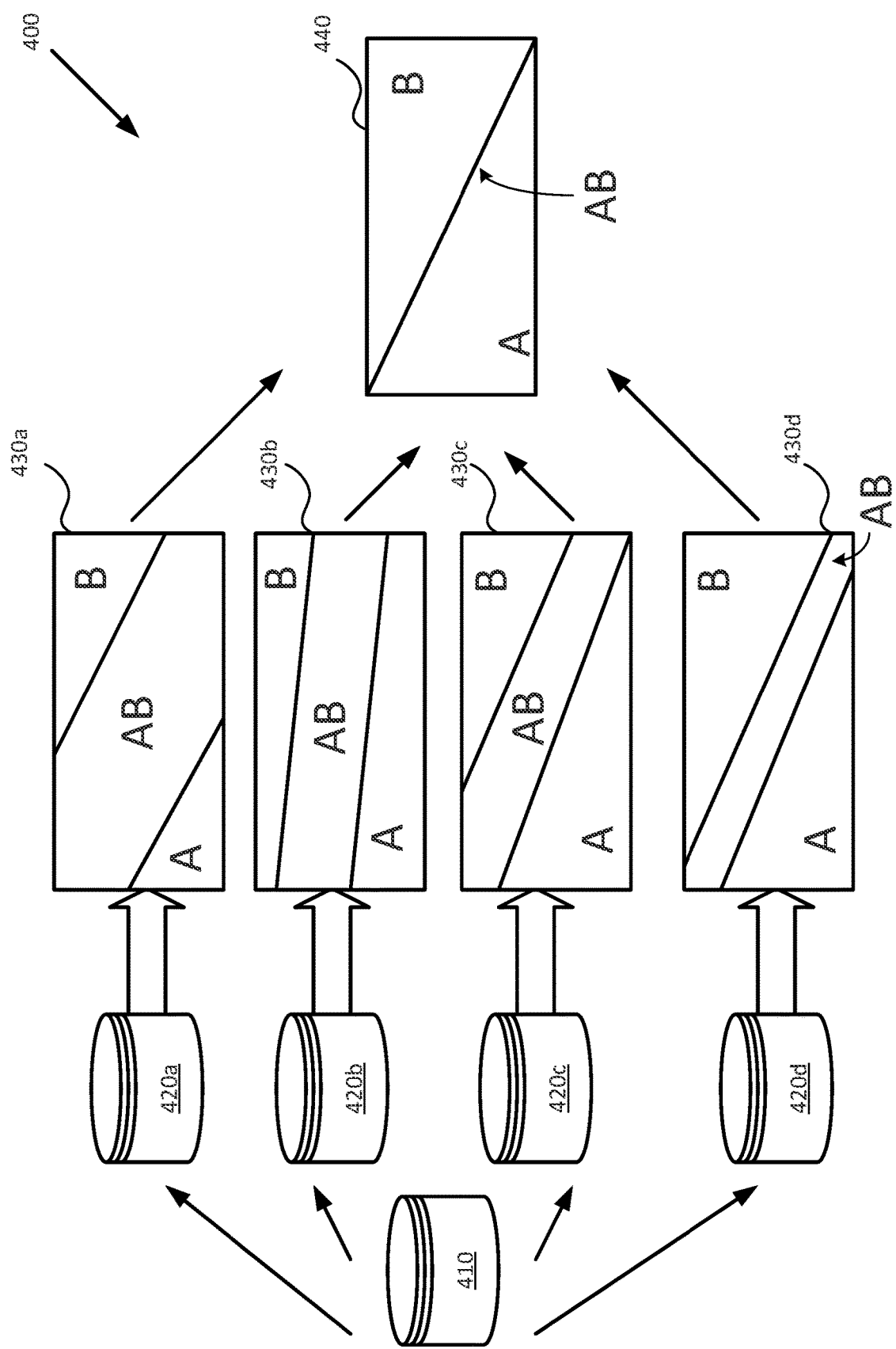
FIG. 4 illustrates an implementation for distinguishing different classes of training data, according to embodiments of the present disclosure.

FIG. 4 illustrates an implementation 400 for distinguishing different classes of training data, according to embodiments of the present disclosure. In some embodiments, the machine learning engine 110 includes one or more sub-models that process the training data into distinct sets (e.g., set-A and set-B) based on various features of the data. In various embodiments, the training data set 410 is split or copied into several data segments 420*a-d* (generally or collectively, data segment 420) for analysis by the individual sub-models. For example, each sub-model may operate using a data segments 420 that copies of the entire training data set 410, or that only uses a portion of the training data set 410 (e.g., files read by particular application, files of a given file type, files located in a given volume, etc.).

By using the different sub-models, the machine learning engine 110 can selectively include or exclude different analyses for determining how to create a stub file for an associated file. For example, the main model of the machine learning engine 110 can use two out of four available sub-models to differentiate between various video files that belong to set-A or set-B to apply different rules for generating stub files for the associated original files. Accordingly, the video files of set-A have stub files that include the first minute of video data, whereas the video files of set-B have stub files that include the last minute of video data. In differentiating between files belonging to set-A or set-B, one or more sub-models trained to differentiate various factors can provide input to the main model of the machine learning engine 110.

Each sub-model can produce a different distributions range 430*a-d* (generally or collectively, distribution range 430) using the associated data segment 420*a-d* as inputs to a neural network. In various embodiments, the sub-models are trained for differentiating different features of the data set. For example, a first sub-model provides greater accuracy in segmenting video files into set-A or set-B than a second sub-model, which in turn provides greater accuracy in segments image files into set-A or set-B than the first sub-model.

Depending on the variable space used by the neural network for each sub-model, the inputs can be classified as belonging to set-A, set-B, or belonging to either set (e.g., set-AB or unknown). As each sub-model may weight different elements of the data set 410 with different values, each sub-model produces a different distribution range 430. The main model of the machine learning engine 110 combines the different distribution ranges 430 with various weights assigned to the individual determinations of which class a given data element belongs to, thereby producing a combined distribution range 440 that identifies each element as belonging to one of set-A or set-B.

The individual sub-models can be reweighted or retrained as new training data are gathered, as the features or metadata used to differentiate files are expected to change and evolve over time based on changes in the users (e.g., behavior/preference pattern) and software (e.g., cadence, frequency, versioning) that access the data. Accordingly, method 300 (of FIG. 3) can be performed on a specified subset of one or more sub-models using data related to those sub-models. For example, if an administrative user reported several undesired read requests related to video files accessed by application A, the stub data manager 100 can perform method 300 to update the sub-models associated with application A and video files, but leave other sub-models un-updated (i.e., not perform method 300 for those sub-models).

Figure 5:
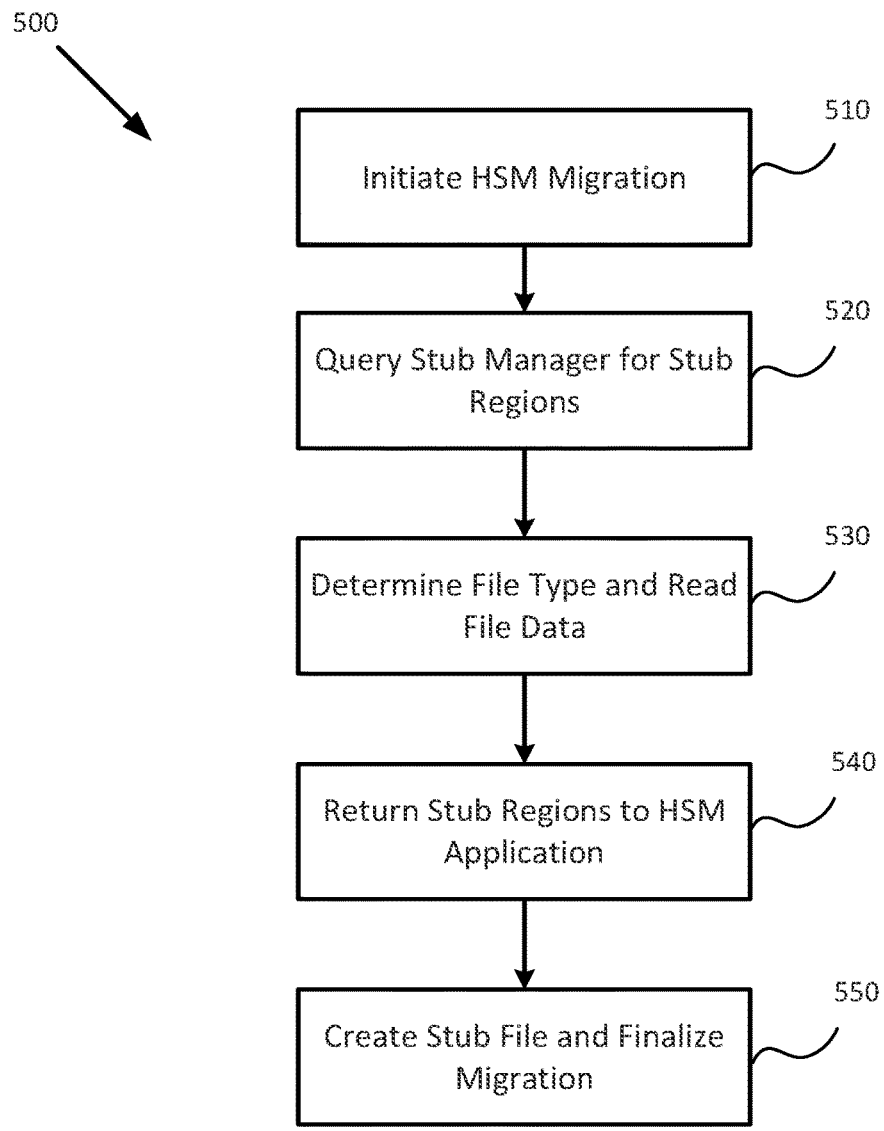
FIG. 5 illustrates a flowchart of a method for migrating data to offline storage, according to embodiments of the present disclosure.

FIG. 5 illustrates a flowchart of a method 500 for migrating data to offline storage, according to embodiments of the present disclosure. Method 500 begins at block 510, where the HSM application 180 is signaled to initiate data migration data from the file system 170 to offline storage 190. Data migration may be signaled by an administrative user, an automated (or scheduled) archival service, or an individual application or user of the file system 170, in various embodiments.

At block 520, the HSM application 180 queries the stub data manager 100 for which regions of the original files to keep in the stub file stored in the file system 170 (i.e., the stub regions). When querying the stub data manager 100, the HSM application 180 provides the file name, and optionally various other metadata related to the original file, including the file path.

At block 530, in response to receiving the query from the HSM application 180, the stub data manager 100 determines the file type and reads the file data for the original file stored in the file system 170. In various embodiments, the file type is determined from a metadata field for the file, a file name (e.g., a file extension), or combinations thereof. The file data read from the original file can include the file type, the full data of the file (e.g., metadata, content data, and preview data), offset, and lengths of the read request, etc. These file data are provided as inputs to the trained machine learning engine 110 to identify the stub regions to use for the original file being migrated.

At block 540, the stub data manager 100 returns the identified stub regions to the HSM application 180. In various embodiments, the stub regions identify one or more regions in the original file to remain in the file system 170, but additionally or alternatively may identify one or more regions in the original file to remove from the file system 170 and migrate to offline storage 190.

At block 550, the HSM application 180 creates the stub file according to the selected stub profile and migrates the data removed from the original file from the file system 170 to offline storage 190. Method 500 may then conclude. As method 500 is performed successively, and the models and stub profiles are updated over time based on observed I/O patterns, the HSM application 180 may produce different stub files based on the same original file in subsequent iterations.

Figure 6:
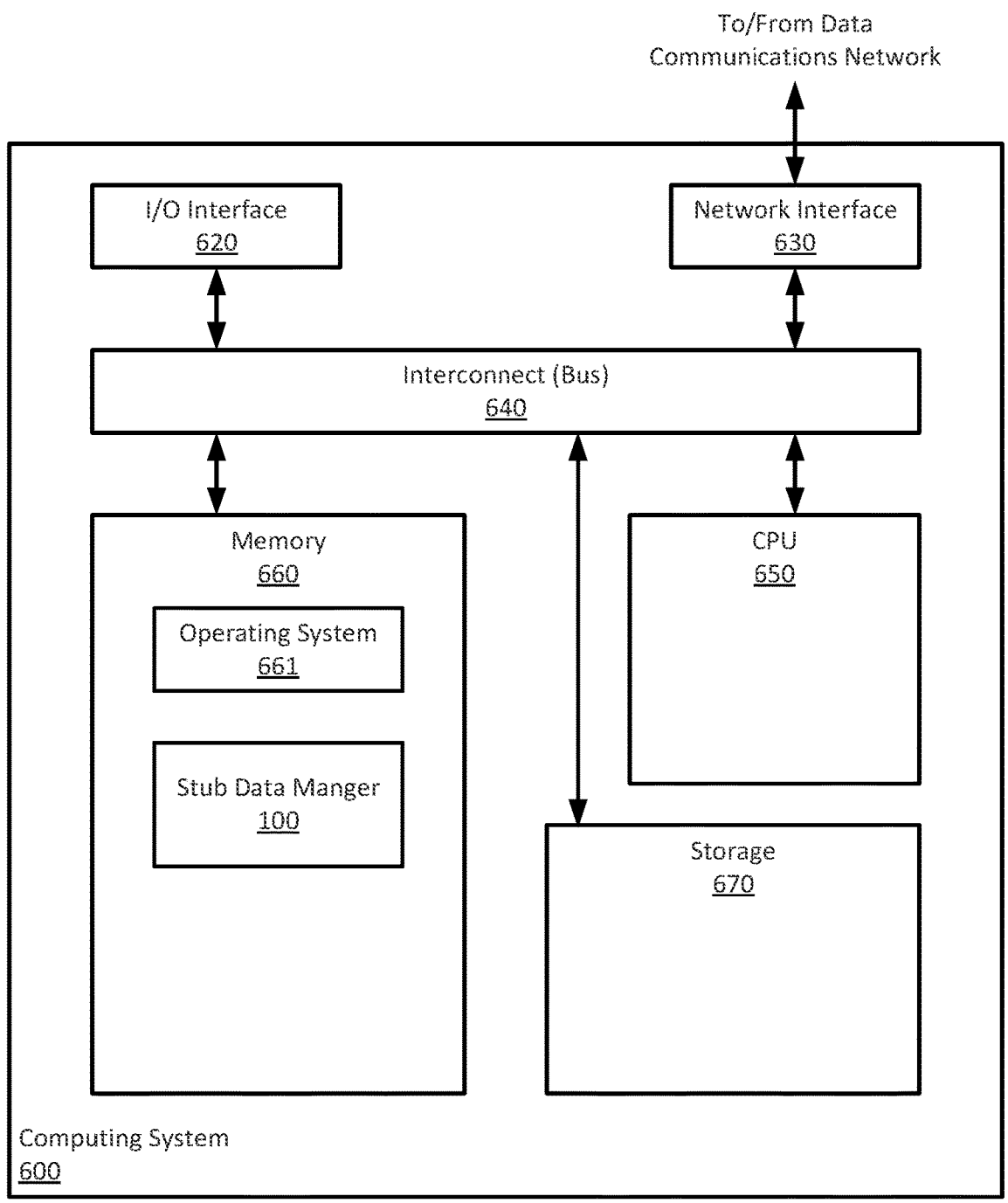
FIG. 6 illustrates a computing system 600, according to embodiments of the present disclosure.

FIG. 6 illustrates a computing system 600, according to embodiments of the present disclosure. As shown, the computing system 600 includes, without limitation, a central processing unit (CPU) 650, a network interface 630, an interconnect 640, a memory 660, and storage 670. The computing system 600 may also include an I/O device interface 620 connecting I/O devices 610 (e.g., keyboard, keypad, display, touchscreen, biometric scanner, and mouse devices) to the computing system 600.

The CPU 650 retrieves and executes programming instructions stored in the memory 660. Similarly, the CPU 650 stores and retrieves application data residing in the memory 660. These instructions are included in an instruction cache 651 for execution and manipulation as described in the present disclosure. The interconnect 640 facilitates transmission, such as of programming instructions and application data, between the CPU 650, I/O device interface 620, storage 670, network interface or other interconnect 640, and memory 660. CPU 650 is included to be representative of a single CPU, a microprocessor, multiple CPUs, a single CPU having multiple processing cores, and the like. And the memory 660 is generally included to be representative of a random access memory. The storage 670 may be a disk drive storage device. Although shown as a single unit, the storage 670 may be a combination of fixed and/or removable storage devices, such as magnetic disk drives, flash drives, removable memory cards or optical storage, network attached storage (NAS), or a storage area-network (SAN). The storage 670 may include both local storage devices and remote storage devices accessible via the network interface 630 (e.g., cloud storage).

Further, although shown as a single computing system, one of ordinary skill in the art will recognized that the components of the computing system 600 shown in FIG. 6 may be distributed across multiple computing systems connected by a data communications network.

As illustrated, the memory 660 includes an operating system 661, which may include one or more file systems, and a set of processor instructions to perform various actions as described herein. These actions may be informed and formatted according to various applications, such as the stub data manager 100, running in the memory as instructions executed by the CPU 650.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
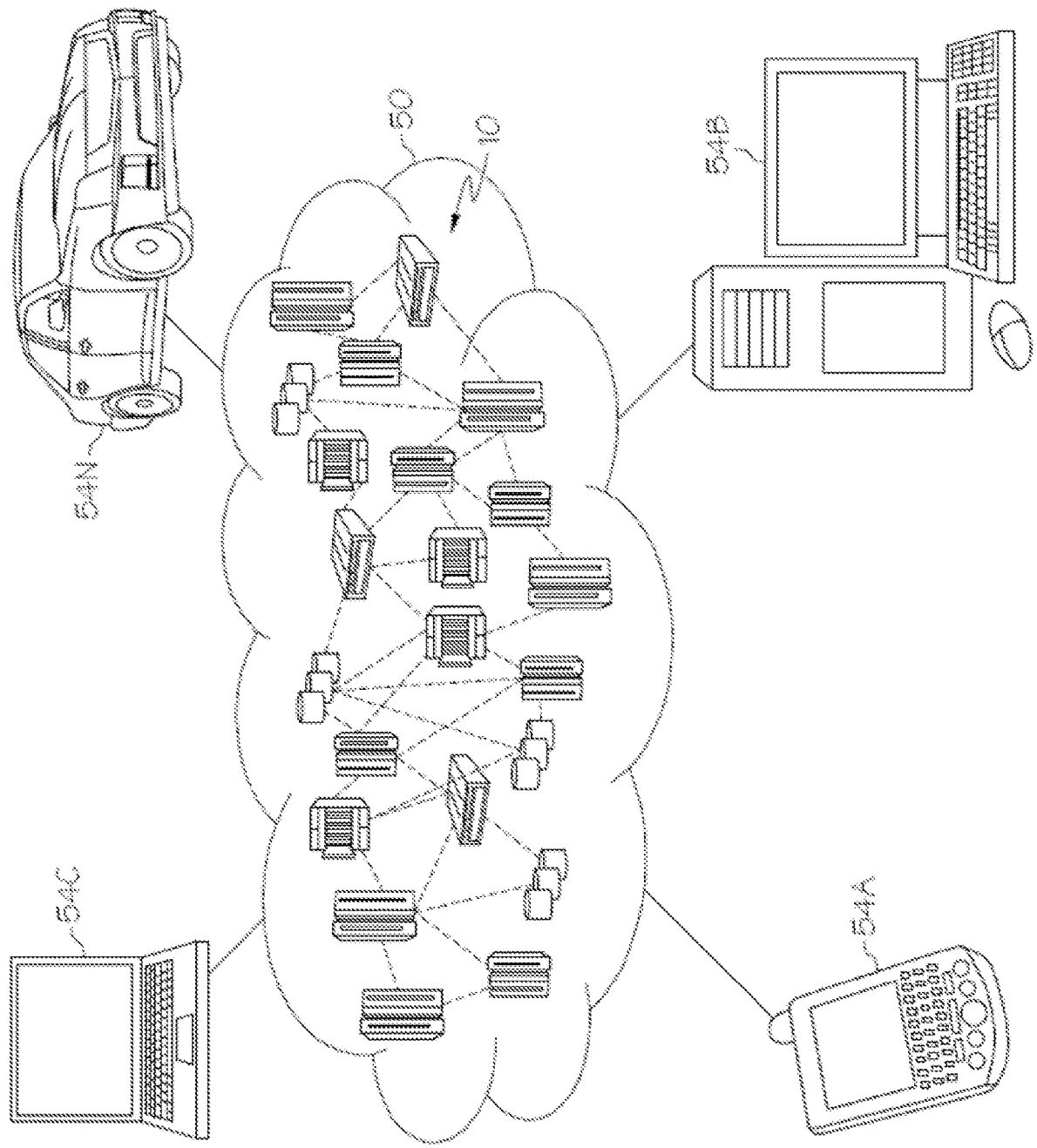
FIG. 7 illustrates a cloud computing environment, according to embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
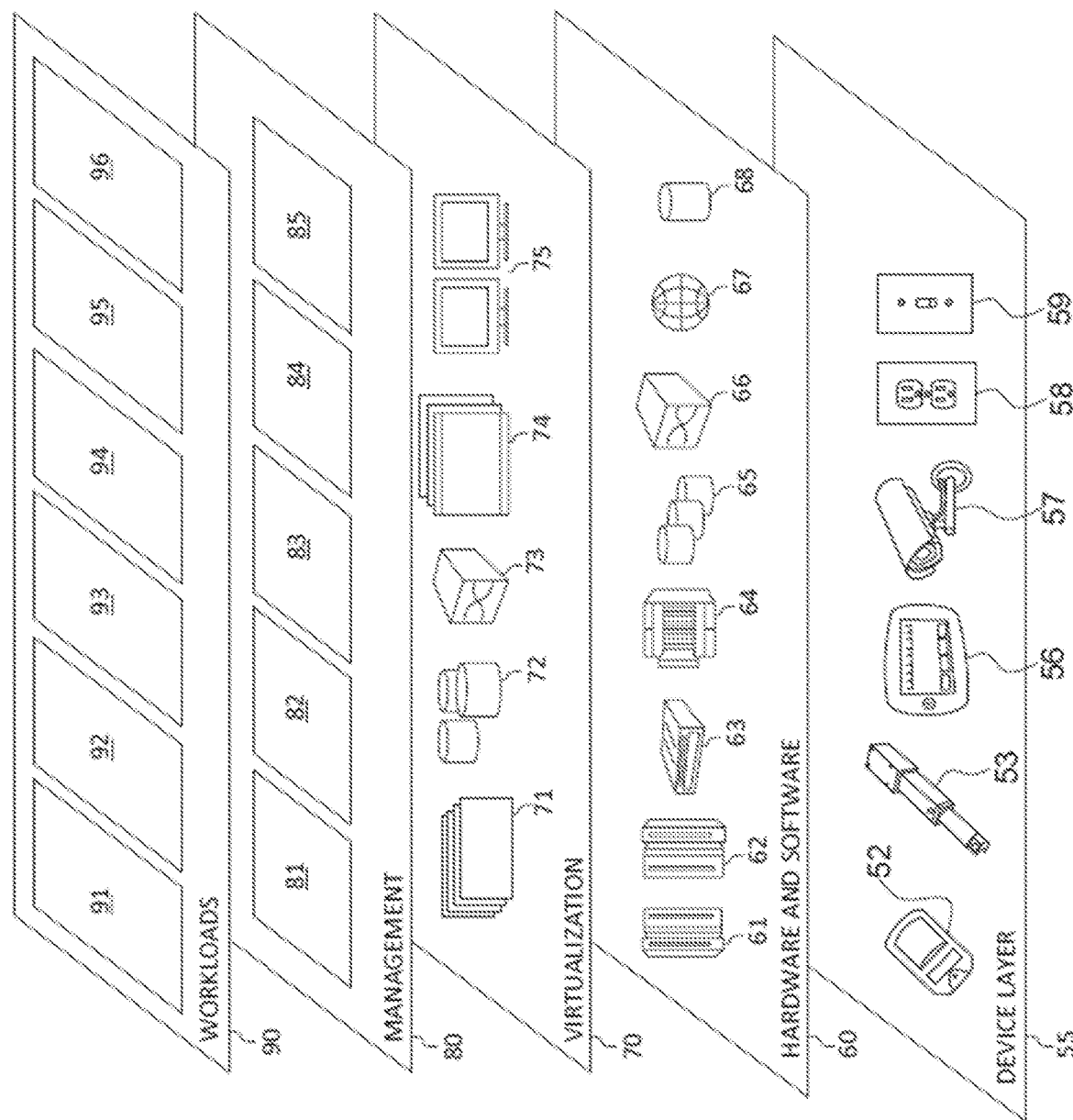
FIG. 8 illustrates a set of functional abstraction layers provided by cloud computing environment, according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
in response to identifying a file to migrate from a file system to offline storage, providing metadata for the file to a machine learning engine;
receiving a stub profile for the file from the machine learning engine, wherein the stub profile indicates a portion of the file to migrate to the offline storage, an offset from a beginning of the file, and a length from the offset for previewing the file, wherein the offset from the beginning of the file and the length from the offset for previewing the file are based on:
a file type for the file, and
an expected read request length for the file determined by the machine learning engine; and
migrating the portion of the file from the file system to an offline storage based on the stub profile.

2. The method of claim 1, further comprising, before providing the metadata to the machine learning engine, performing an training for the machine learning engine, the training comprising:
signaling the file system to produce file previews for a plurality of files; and
for each individual file of the plurality of files:
determining a file type for each individual file;
providing file data to the machine learning engine; and
performing a supervised learning operation for the machine learning engine based on the file type and the file data.

3. The method of claim 1, further comprising, after migrating the portion of the file from the file system to the offline storage:
monitoring operations of the file system;
in response to detecting a read operation of the portion of the file by the file system:
determining a file type for the file;
providing file data to the machine learning engine; and
performing a supervised learning operation for the machine learning engine based on the file type and the file data to update the machine learning engine.

4. The method of claim 3, wherein the supervised learning operation is based on feedback received from the file system for whether the read operation was an undesired read operation.

5. The method of claim 3, wherein the supervised learning operation is performed in response to a threshold number of read operations having been observed.

6. The method of claim 1, wherein migrating the portion of the file from the file system to the offline storage based on the stub profile further comprises:
creating a stub file in the file system that includes metadata and a preview of the file;
removing content data for the file from the file system; and
storing the content data in the offline storage.

7. The method of claim 1, wherein file data provided to the machine learning engine include:
metadata for the file;
content data for the file;
preview data for the file; and
an offset and a length of a read request for the file stored in the offline storage.

8. A system, comprising:
a processor; and
a memory including instructions that when executed by the processor perform an operation that includes:
in response to identifying a file to migrate from a file system to offline storage, providing metadata for the file to a machine learning engine;
receiving a stub profile for the file from the machine learning engine, wherein the stub profile indicates a portion of the file to migrate to the offline storage, an offset from a beginning of the file and a length from the offset for previewing the file, wherein the offset from the beginning of the file and the length from the offset for previewing the file are based on:
a file type for the file, and
an expected read request length for the file determined by the machine learning engine; and
migrating a portion of the file from the file system to an offline storage based on the stub profile.

9. The system of claim 8, wherein the operation further comprises, before providing the metadata to the machine learning engine, performing an training for the machine learning engine, the training comprising:
signaling the file system to produce file previews for a plurality of files; and
for each individual file of the plurality of files:
determining a file type for each individual file;
providing file data to the machine learning engine; and
performing a supervised learning operation for the machine learning engine based on the file type and the file data.

10. The system of claim 8, wherein the operation further comprises, after migrating the portion of the file from the file system to the offline storage:
monitoring operations of the file system;
in response to detecting a read operation of the portion of the file by the file system:
determining a file type for the file;
providing file data to the machine learning engine; and
performing a supervised learning operation for the machine learning engine based on the file type and the file data to update the machine learning engine.

11. The system of claim 10, wherein the supervised learning operation is based on feedback received from the file system for whether the read operation was an undesired read operation.

12. The system of claim 10, wherein the supervised learning operation is performed in response to a threshold number of read operations having been observed.

13. The system of claim 8, wherein migrating the portion of the file from the file system to the offline storage based on the stub profile further comprises:
creating a stub file in the file system that includes metadata and a preview of the file;
removing content data for the file from the file system; and
storing the content data in the offline storage.

14. The system of claim 8, wherein file data provided to the machine learning engine include:
metadata for the file;
content data for the file;
preview data for the file; and
an offset and a length of a read request for the file stored in the offline storage.

15. A computer-readable storage medium including instructions that when executed by a processor perform an operation that includes:

in response to identifying a file to migrate from a file system to offline storage, providing metadata for the file to a machine learning engine;

receiving a stub profile for the file from the machine learning engine, wherein the stub profile indicates a portion of the file to migrate to the offline storage, an offset from a beginning of the file and a length from the offset for previewing the file, wherein the offset from the beginning of the file and the length from the offset for previewing the file are based on:

a file type for the file, and an expected read request length for the file determined by the machine learning engine; and migrating a portion of the file from the file system to an offline storage based on the stub profile.

16. The computer-readable storage medium of claim 15, wherein the operation further comprises, before providing the metadata to the machine learning engine, performing an training for the machine learning engine, the training comprising:

signaling the file system to produce file previews for a plurality of files; and for each individual file of the plurality of files:
determining a file type for each individual file;
providing file data to the machine learning engine; and
performing a supervised learning operation for the machine learning engine based on the file type and the file data.

17. The computer-readable storage medium of claim 15, wherein the operation further comprises, after migrating the portion of the file from the file system to the offline storage:

monitoring operations of the file system;

in response to detecting a read operation of the portion of the file by the file system:
determining a file type for the file;
providing file data to the machine learning engine; and
performing a supervised learning operation for the machine learning engine based on the file type and the file data to update the machine learning engine.

18. The computer-readable storage medium of claim 17, wherein the supervised learning operation is based on feedback received from the file system for whether the read operation was an undesired read operation.

19. The computer-readable storage medium of claim 17, wherein the supervised learning operation is performed in response to a threshold number of read operations having been observed.

20. The computer-readable storage medium of claim 15, wherein migrating the portion of the file from the file system to the offline storage based on the stub profile further comprises:

creating a stub file in the file system that includes metadata and a preview of the file;

removing content data for the file from the file system; and storing the content data in the offline storage.

* * * * *